United States Patent
Kumar et al.

(10) Patent No.: US 8,538,561 B2
(45) Date of Patent: Sep. 17, 2013

(54) METHOD AND SYSTEM TO ESTIMATE VARIABLES IN AN INTEGRATED GASIFICATION COMBINED CYCLE (IGCC) PLANT

(75) Inventors: Aditya Kumar, Niskayuna, NY (US);
Ruijie Shi, Niskayuna, NY (US);
Mustafa Dokucu, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 274 days.

(21) Appl. No.: 13/053,690

(22) Filed: Mar. 22, 2011

(65) Prior Publication Data

US 2012/0245747 A1    Sep. 27, 2012

(51) Int. Cl.
*G05B 13/04* (2006.01)

(52) U.S. Cl.
USPC ............................................. 700/31; 700/288

(58) Field of Classification Search
USPC ............................................. 700/29, 31, 288
See application file for complete search history.

(56) References Cited

U.S. PATENT DOCUMENTS

| | | | |
|---|---|---|---|
| 6,269,286 B1 | 7/2001 | Tse et al. | |
| 6,285,971 B1 * | 9/2001 | Shah et al. | 703/2 |
| 6,757,569 B2 * | 6/2004 | Lin | 700/29 |
| 6,801,810 B1 * | 10/2004 | Poncet | 700/12 |
| 7,009,554 B1 * | 3/2006 | Mookerjee et al. | 342/195 |
| 7,180,443 B1 * | 2/2007 | Mookerjee et al. | 342/195 |
| 7,363,094 B2 * | 4/2008 | Kumar | 700/29 |
| 7,375,679 B1 * | 5/2008 | Mookerjee et al. | 342/195 |
| 7,608,938 B2 | 10/2009 | Andrew et al. | |
| 7,894,512 B2 * | 2/2011 | Beadle et al. | 375/226 |
| 7,987,145 B2 * | 7/2011 | Baramov | 706/21 |
| 2004/0123600 A1 | 7/2004 | Brunell et al. | |
| 2005/0193739 A1 | 9/2005 | Brunell et al. | |
| 2007/0289216 A1 | 12/2007 | Tsangaris et al. | |
| 2008/0178600 A1 * | 7/2008 | Healy et al. | 60/773 |
| 2009/0292436 A1 | 11/2009 | D'amato et al. | |

(Continued)

FOREIGN PATENT DOCUMENTS

| | | |
|---|---|---|
| JP | 2006046716 A | 2/2006 |
| WO | WO2010070288 A2 | 6/2010 |

OTHER PUBLICATIONS

Kandepu, R., Imsland, L., Foss. B.A. "Constrained State Estimation Using the Unscented Kalman Filter". 16th Mediterranean Conference on Control and Automation (2008): 1453-1458.*

Zhang et al., "Techno-Economic Feasibility of Highly Efficient Cost-Effect Thermoelectric-SOFC Hybrid Power Generation Systems", DOE Scientific and Technical Information, Sep. 30, 2007.

(Continued)

*Primary Examiner* — Ryan Jarrett
(74) *Attorney, Agent, or Firm* — Ann M. Agosti

(57) ABSTRACT

System and method to estimate variables in an integrated gasification combined cycle (IGCC) plant are provided. The system includes a sensor suite to measure respective plant input and output variables. An extended Kalman filter (EKF) receives sensed plant input variables and includes a dynamic model to generate a plurality of plant state estimates and a covariance matrix for the state estimates. A preemptive-constraining processor is configured to preemptively constrain the state estimates and covariance matrix to be free of constraint violations. A measurement-correction processor may be configured to correct constrained state estimates and a constrained covariance matrix based on processing of sensed plant output variables. The measurement-correction processor is coupled to update the dynamic model with corrected state estimates and a corrected covariance matrix. The updated dynamic model may be configured to estimate values for at least one plant variable not originally sensed by the sensor suite.

25 Claims, 3 Drawing Sheets

(56) References Cited

U.S. PATENT DOCUMENTS

| | | |
|---|---|---|
| 2010/0138004 A1 | 6/2010 | Chia et al. |
| 2010/0146858 A1 | 6/2010 | Zamansky et al. |
| 2010/0275781 A1 | 11/2010 | Tsangaris et al. |
| 2010/0302691 A1 | 12/2010 | Premerlani et al. |
| 2011/0036096 A1 | 2/2011 | Bommareddy et al. |
| 2012/0109538 A1* | 5/2012 | Covello et al. ............ 702/33 |
| 2012/0109620 A1* | 5/2012 | Gaikwad et al. .......... 703/21 |

OTHER PUBLICATIONS

Simon, Dan, "Aircraft Turbofan Engine Health Estimation Using Constrained Kalman Filtering", Journal of Engineering for Gas Turbines and Power, Apr. 2005, vol. 127, p. 323-328.

Van Der Merwe, Rudolph, "Sigma-Point Kalman Filters for Non-Linear Estimation and Sensor-Fusion-Applications to Integrated Navigation", American Institute of Aeronautics and Astronautics, p. 1-30.

* cited by examiner

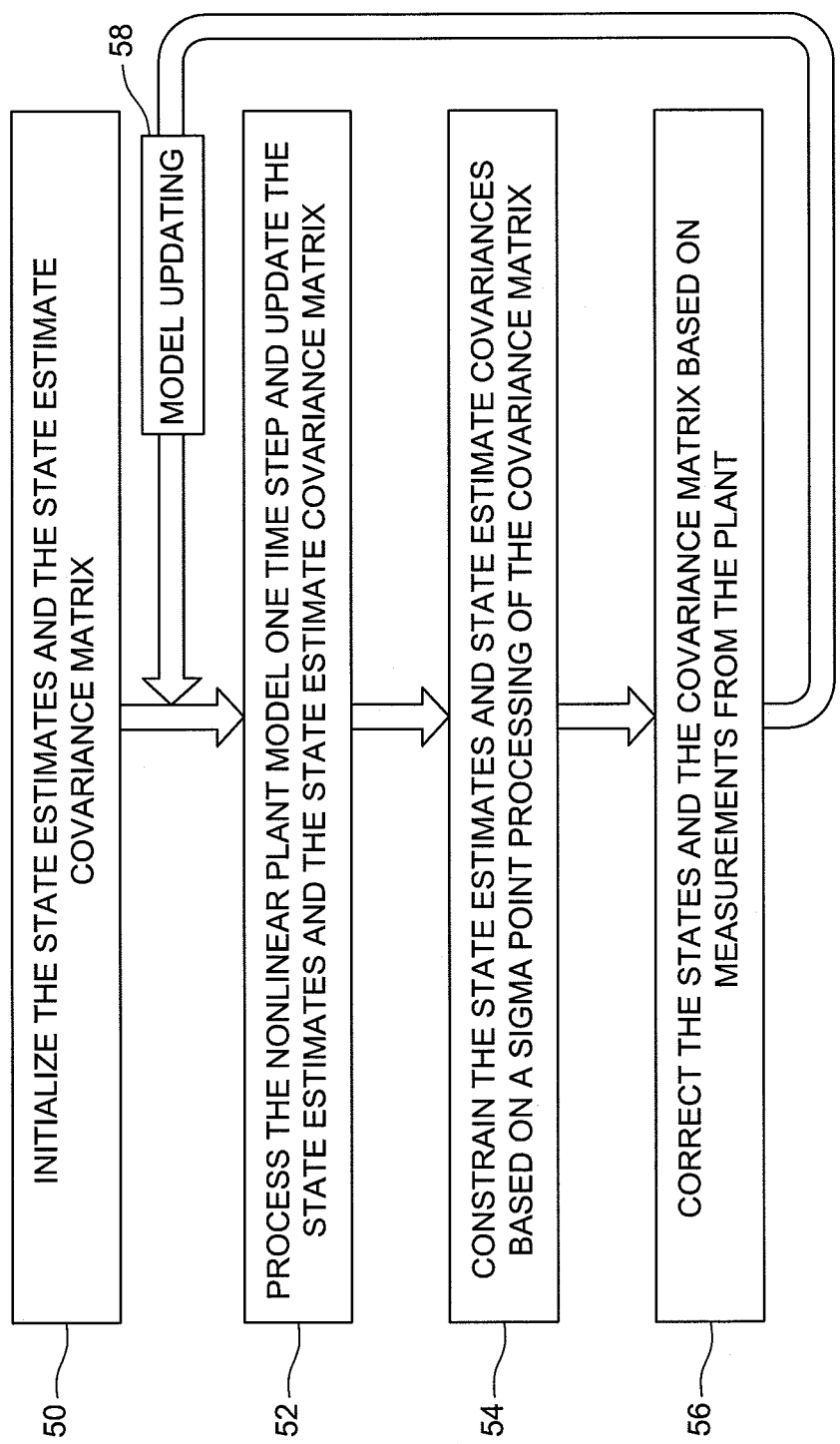

US 8,538,561 B2

METHOD AND SYSTEM TO ESTIMATE VARIABLES IN AN INTEGRATED GASIFICATION COMBINED CYCLE (IGCC) PLANT

STATEMENT REGARDING FEDERALLY SPONSORED DEVELOPMENT

This invention was made with government support under Contract No. DE-FC26-07NT43094, awarded by the United States Department of Energy. Accordingly, the United States Government may have certain rights in this invention.

CROSS-REFERENCE TO RELATED APPLICATIONS

This application is related to U.S. patent application Ser. No. 13/053,731, titled "Model Predictive Control System And Method For Integrated Gasification Combined Cycle Power Generation", filed concurrently herewith and herein incorporated by reference in its entirety.

FIELD

The present invention is generally related to integrated gasification combined cycle (IGCC) power generation, and, more particularly, to method and system to estimate variables in an IGCC power generation plant.

BACKGROUND

Integrated Gasification Combined Cycle (IGCC) technology continues progressing as an attractive technology for clean and efficient electric power generation, such as may be generated from abundant carbonaceous materials, e.g., coal and other relatively low-cost fuels. At the front end of IGCC is a process known as gasification, which is a partial oxidation process that transforms the fuel (e.g., coal) into a stream of combustible synthesis gas (syngas). IGCC is environmental-friendly because pollution-causing emissions (e.g., $SO_x$, $NO_x$, mercury, particulates, etc.) may be substantially removed from the syngas stream before combustion occurs. While IGCC technology intrinsically holds significant potential for clean and efficient power generation, there are opportunities yet to be exploited to improve IGCC power generation for enhanced reliability, availability, efficiency and flexibility.

It is known that present techniques for operation of an IGCC power plant tend to be based on simplistic control procedures, as may be conveyed to an operator by way of rigid and cumbersome operator guidelines, not necessarily designed to achieve any meaningful optimization strategy, such as may be due to limited online information for monitoring and controlling the IGCC plant. For example, a gasification section of the IGCC plant may be subject to a relatively harsh operating environment and as a result limited online sensors may be available for monitoring and control.

It is also known that model-based estimation implementations may be helpful to estimate plant variables. However, there are challenges that can arise since often modeling and/or sensing uncertainties may not be appropriately accounted for in such estimation implementations.

In view of the foregoing considerations, it would be desirable to formulate an estimation strategy where one may combine plant measurements, as may be obtained by way of a sensor suite, with model-based estimation for estimating plant variables, which are appropriately corrected for modeling and/or sensing uncertainties, without adding any substantial computational burden and while achieving substantial estimation accuracy.

BRIEF DESCRIPTION

Generally, at least some aspects of the present invention may be fulfilled by a system to estimate variables in an integrated gasification combined cycle (IGCC) power generation plant, the system may include a sensor suite coupled to sense signals indicative of respective plant input variables and plant output variables. The system may further include an extended Kalman filter (EKF) coupled to receive sensed plant input variables and comprising a dynamic model of the plant to generate at a discrete time a plurality of plant state estimates and a covariance matrix for the state estimates. A preemptive-constraining processor may be configured to preemptively constrain the state estimates and covariance matrix to be free of constraint violations. A measurement-correction processor may be configured to correct constrained state estimates and a constrained covariance matrix based on processing of sensed plant output variables. The measurement-correction processor is coupled to update the dynamic model with corrected state estimates and a corrected covariance matrix. The updated dynamic model may be configured to estimate values for at least one plant variable not originally sensed by the sensor suite.

At least some additional aspects of the present invention may be fulfilled by a method to estimate variables in an integrated gasification combined cycle (IGCC) power generation plant. The method may include the following actions: coupling a sensor suite to sense signals indicative of respective plant input variables and plant output variables; supplying sensed plant input variables to an extended Kalman filter (EKF), which comprises a dynamic model of the plant to generate at a discrete time a plurality of state estimates and a covariance matrix for the state estimates; preemptively constraining the state estimates and covariance matrix to be free of constraint violations; correcting constrained state estimates and a constrained covariance matrix based on processing of sensed plant output variables; updating the dynamic model with corrected state estimates and a corrected covariance matrix; and estimating with the updated dynamic model at least one plant variable not originally sensed by the sensor suite.

Still additional aspects of the present invention may be fulfilled by an non-transitory tangible computer-readable medium having computer-executable instructions, which when executed by a processor are configured to perform the following actions: measuring signals from a sensor suite, the signals indicative of respective plant input variables and plant output variables; supplying sensed plant input variables to an extended Kalman filter, which comprises a dynamic model of the plant to generate at a discrete time a plurality of state estimates and a covariance matrix for the state estimates; preemptively constraining the state estimates and covariance matrix to be free of constraint violations; correcting constrained state estimates and a constrained covariance matrix based on processing of sensed plant output variables; updating the dynamic model with corrected state estimates and a corrected covariance matrix; and estimating with the updated dynamic model at least one plant variable not originally sensed by the sensor suite.

DRAWINGS

These and other features, aspects, and advantages of the present invention will become better understood when the following detailed description is read with reference to the accompanying drawings in which like characters represent like parts throughout the drawings, wherein:

FIG. 3 is a flow chart illustrating example processing actions in connection with a preemptively constrained extended Kalman filter (EKF), as may be part of the estimation system shown in FIG. 1.

DETAILED DESCRIPTION

Aspects of the present invention may be applied in the context of an online sensing system for an Integrated Gasification Combined Cycle (IGCC) power generation plant. In one example embodiment one may combine measurements of plant variables, as may be obtained by way of a sensor suite, with model-based estimation (e.g., extended Kalman filter (EKF) estimation) for estimating plant variables, some of which may not have been originally measured by the sensor suite.

As will be appreciated by one skilled in the art, EKF estimation has proven to be a powerful computational tool to estimate the states of a dynamic plant. However, in traditional EKF implementations there are challenges that can arise since often model or signal uncertainties may not be appropriately accounted for in such EKF implementations. For example, constraints on plant states may be neglected because such constraints may not be readily accommodated by the processing architecture of traditional EKF implementations. The constraints may be based on real-world physical and/or operational considerations of the plant and therefore constraint violations may lead to inaccurate EKF estimation or could even lead to an erroneous assessment of the actual operating conditions of the plant.

The inventors of the present invention propose an innovative and elegant strategy or preemptively constraining the EKF so that without adding any substantial computational burden one may achieve a substantial improvement in the accuracy of the EKF estimates. As used herein, "preemptive constraining" refers to performing processing actions adapted to avoid constraint violations prior to performing a (Kalman filter) measurement update.

Figure 1:
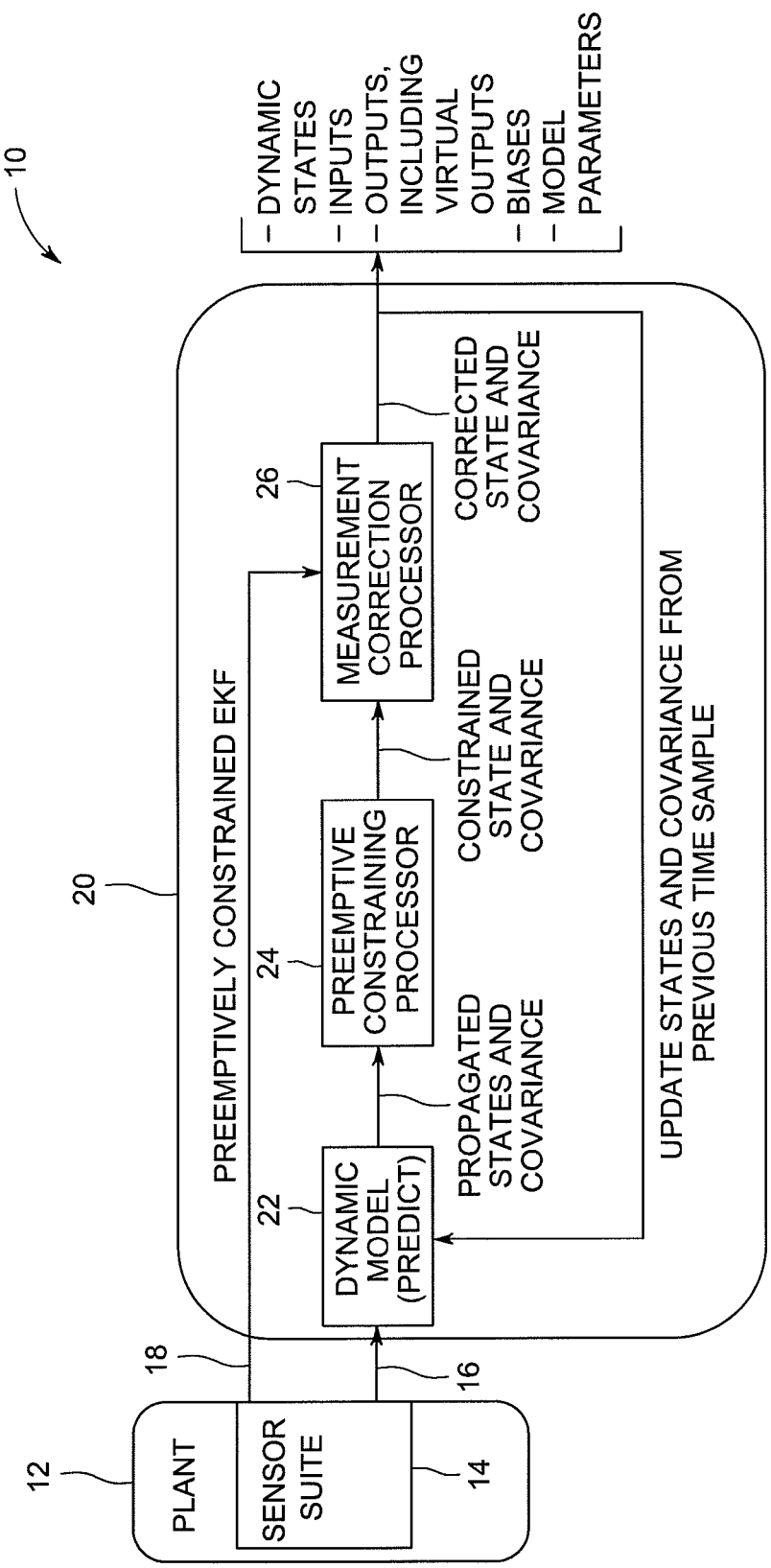
FIG. 1 is a block diagram representation of an example estimation system embodying aspects of the present invention, as may be used to perform online estimation in an Integrated Gasification Combined Cycle (IGCC) power plant.

FIG. 1 is a block diagram representation of an example estimation system 10 embodying aspects of the present invention. In one example embodiment, system 10 may be used to estimate parameters in an integrated gasification combined cycle (IGCC) power generation plant 12. A sensor suite 14 may be coupled to sense signals indicative of respective plant input variables 16, such as fuel input (e.g., coal slurry), recycled $CO_2$, oxygen feed, etc. Sensor suite 14 may be further coupled to sense signals indicative of respective plant output variables 18, such as syngas composition and temperature, syngas flow rate, carbon conversion, etc.

Estimation system 10 may further include an extended Kalman filter (EKF) 20, which comprises a preemptively-constrained EKF in accordance with aspects of the present invention. A dynamic model 22 of the plant is coupled to receive sensed (i.e., measured) plant input variables 16 and propagate at a discrete time a plurality of plant state estimates and a covariance matrix for the state estimates. It will be appreciated that at this stage of the Kalman cycle, the plant state estimates (e.g., a priori estimates) may be subject to sensing inaccuracies, such as bias and/or noise present in measurements from sensor suite 14 and/or modeling inaccuracies, which may be present in dynamic model 12.

A preemptive-constraining processor 24 is configured to preemptively constrain the propagated state estimates and covariance matrix to be free of constraint limit violations. In one example embodiment, preemptive-constraining processor 24 generates constrained state estimates and a constrained covariance matrix. A measurement correction processor 26 is configured to correct the constrained state estimates and the constrained covariance matrix based on sensed plant output variables 18. In one example embodiment, such a correction may involve comparing at least one sensed plant output variable with at least one corresponding model output variable.

Measurement correction processor 26 is coupled to update dynamic model 22 with corrected state estimates and a corrected covariance matrix. In one example embodiment, a corrected state estimate may comprise respective corrections for dynamic states of the plant, inputs (e.g., control inputs), output variables, such as may include virtual outputs (i.e., plant output variables not measured by sensor suite 14), biases for measured variables, and model parameters. In one example embodiment, updating the dynamic model may include defining a previously unknown model parameter and/or updating a model parameter which varies in time, such as gasifier kinetics, radiant syngas cooler (RSC) fouling etc.). In one example embodiment, the updated dynamic model may be configured to estimate values for at least one plant variable, which may not have been originally sensed by sensor suite 14 (i.e., virtual sensing). Although dynamic model 22, preemptive constraining processor 24 and measurement correction processor 26 are illustrated in FIG. 1 as separate processors (e.g., processing modules), it will be readily appreciated by one skilled in the art that such processors may be integrated in a common processor.

Figure 2:
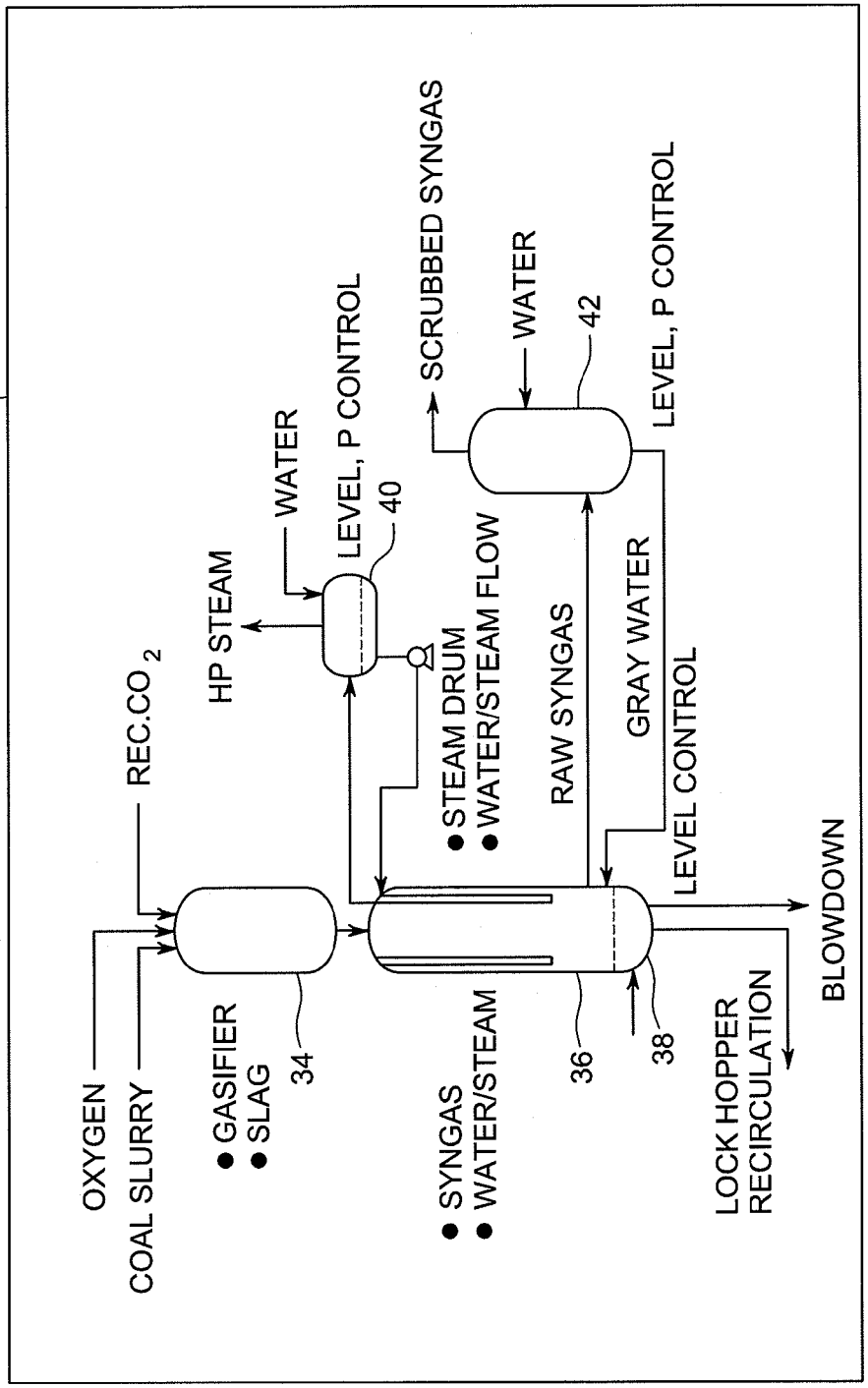
FIG. 2 is a simplified schematic model representation of an example gasification section of the IGCC plant, as may be simulated by a dynamic model, as may be part of the estimation system shown in FIG. 1.

FIG. 2 is a simplified schematic model representation of an example gasification section 32, as may be modeled by dynamic model 22. As will be readily appreciated by one skilled in the art, example model components of gasification section 32 may include a gasifier model component 34, a radiant syngas cooler (RSC) model component 36, a RSC quench model component 38, a high-pressure (HP) steam drum model component 40 and a scrubber model component 42. Example input variables received by gasifier model component 34 may be indicative of fuel input (e.g., coal slurry), recycled $CO_2$, and oxygen feed. Example model output variables supplied by gasifier model component 34 may be gasifier outlet syngas composition and temperature, ash flow and carbon conversion.

Example inputs received by RSC model component 36 may be the syngas output stream from gasifier model component 34, and water/steam flow from HP steam drum model component 40 to, for example, calculate transient variation in the syngas temperature, a level of RSC tubing stress and the steam fraction in the water stream the RSC tubing. Quench model component 38 may receive as example inputs the respective syngas and ash/slag streams from the RSC outlet to, for example, calculate a quench outlet syngas stream flow rate, composition and enthalpy. RSC model component 36 may be coupled to HP steam drum model component 40 to, for example, calculate a water/steam circulation flow rate between the HP stream drum and the RSC piping. Scrubber model component 42 may receive from quench model component 38 the quench syngas output and then calculate a scrubbed syngas composition and temperature. It will be appreciated that the foregoing model representation of gasification section 32 should be construed in an example sense and not in a limiting sense being that aspects of the present invention are neither limited to any specific modeling implementation for the gasification section of the IGCC plant nor to any specific gasification design.

In one example embodiment, dynamic model 22 may comprise a reduced-order dynamic model of the gasification section suitable for online model prediction and optimization. In one example embodiment, a reduced-order model may be able to perform a simulation substantially faster (e.g., approximately at least a 1000 times faster) than a full-order model while maintaining a relatively high-level of accuracy. It will be appreciated that in a practical embodiment the faster simulation speed of the reduced-order model is desirable for real-time simulation and sensing and/or control design.

FIG. 3 is a flow chart illustrating example processing actions in connection with extended Kalman filter 20 (FIG. 1) embodying aspects of the present invention. Block 50 represents an initialization action, such as may allow respective initialization of state estimates and a covariance matrix for the state estimates. Block 52 allows processing dynamic model 22 one time step, as may be allow respective updating of the state estimates and the state covariance matrix. Block 52 represents a pre-emptive constraining action, such as may allow a respective preemptive constraining of the state estimates and covariance matrix based on a sigma-point processing of the covariance matrix. Block 56 represents a measurement correction action, such as may involve use of sensed plant output variables to correct the constrained states and constrained covariance matrix. As will be appreciated by one skilled in the art, EKF is a recursive process and in one example embodiment, block 58 allows performing an updating action of dynamic model 22, prior to iteratively proceeding to a next time step in block 52 and subsequent processing actions, such as constraining action 54 and measurement correcting action 56.

Mathematical Underpinnings

The description below will focus on basic mathematical underpinnings of an extended Kalman filter (EKF) embodying aspects of the present invention. The description below is not meant to be a mathematical treatise on EKF since such information is readily available in the literature and our intent is just meant to appropriately highlight concepts embodying aspects of the present invention.

$X_k$ represents a state vector (i.e., an overall state vector), which in one example embodiment may comprise dynamic plant states $x_k$, inputs $u_k$, biases $b_k$ and model parameters $p_k$, where k denotes a discrete sampling time.

$$X_k = \begin{bmatrix} x_k \\ u_k \\ b_k \\ p_k \end{bmatrix} \quad \text{Eq. 1}$$

Terminology

P represents a covariance matrix for the state vector. Presuming an example size of the state vector is $n_x \times 1$, the size of the covariance matrix P would be $n_x \times n_x$. Matrix Q represents modeling uncertainty, such as may be due to modeling inaccuracies, Matrix R represents measurement uncertainty, such as may be due to sensor noise and/or bias, UB and LB respectively represent upper and lower bounds (e.g., constraint limits) for the state vector, EQ represents equality type of constraints for the state vector.

EKF Initialization $$X_{0|0}, P_{0|0}, Q, R, UB, LB, EQ$$

As will be appreciated by one skilled in the art, the notation $X_{0|0}$ indicates an initial state vector and can be read as initial state estimates at an initialization time (e.g., time 0) based on measurements up to and including time 0. In general, $X_{k|k}$ can be read as "the estimate of X at time k based on measurements up to and including time k, (i.e., a posteriori estimate). Similarly, $X_{k|k-1}$ can be read as "the estimate of X at time k based on measurements until time k−1, (i.e., a priori estimate). $P_{0|0}$ indicates an initial covariance matrix for the state vector.

EKF Propagation $$X_{k|k-1} = F_{Ts}(X_{k-1|k-1}, u_{k-1|k-1}, P_{k-1|k-1}) \quad \text{Eq. 2}$$

Eq. 2 indicates an example processing action of dynamic model 22 (FIG. 1) to generate the a priori estimates for a current time step.

$$Y_k = g(x_{k|k-1}, u_{k|k-1}, P_{k|k-1}) \quad \text{Eq. 3}$$

Eq. 3 indicates predicted outputs for the current time step.

$$X_k = AX_{k-1}$$

$$Y_k = CX_k \quad \text{Eq. 4}$$

Eq. 4 represents a linearization of dynamic model (22) to obtain respective state-space matrixes A and C.

$$P_{k|k-1} = AP_{k-1|k-1}A^T + Q \quad \text{Eq. 5}$$

Eq. 5 indicates an updating processing action for the covariance matrix using the linearized form of the model and including model noise. It should be appreciated that in one example embodiment Eqs. 2-5 may be encompassed by block 52 (FIG. 3).

In accordance with aspects of the present invention, the inventors of the present invention have developed an efficient computational algorithm for preemptively constraining the EFK prior to performing processing actions under the section titled "Performing Measurement Update".

It is noted that traditional EKF estimation techniques do not perform the processing actions under the following section titled "Preemptive Constraining of EKF". That is, traditional EKF estimation would continue to the processing actions under the section titled "Performing Measurement Update", which will be recognized by one skilled in the art as the portion of the Kalman filter cycle where a measurement update adjusts the a priori estimate by an actual measurement at that time to generate the posteriori estimate. See for example the organic structure of Eq. 11. It will be appreciated that the measurement update involves computation of a Kalman gain $K_k$, which is in turn influenced by covariance estimates. See for example the organic structure of Eq. 12. Another step is to compute an a posteriori covariance matrix. See for example the organic structure of Eq. 13. It would be appreciated that constraint violations would detrimentally affect the accuracy of the foregoing computations. Thus, by performing the processing actions to be described below under the section titled "Preemptive Constraining of EKF", one advantageously ensures that computation of the foregoing equations is respectful of any applicable constraints without introducing any substantial computational burden.

Preemptive Constraining of EKF

Determining Sigma-Points (SP)

$$X = X_{k|k-1} 1_{1 \times 2n_x} \quad \text{Eq. 6}$$

Eq. 6 indicates a replicating action, where the state vector $X_k$ obtained in the propagation step would be replicated $2n_x$ times.

$$\tilde{X} = X + [\sqrt{n_x P_{k|k-1}} , -\sqrt{n_x P_{k|k-1}}] \qquad \text{Eq. 7}$$

Eq. 7 indicates adding and subtracting one or more standard deviations about a mean value of each state estimate to generate a sigma point matrix.

Applying Constraints $$\tilde{X}(i,j) = \min(\max(LB_i, X(i,j)), UB_i) \qquad \text{Eq. 8}$$

for all i=1, ..., $n_x$ and j=1, ..., $2n_x$

UB and LB respectively represent $n_x \times 1$ upper and lower bound vectors in Eq. 8

Determining Matrixes with Constrained Mean and Covariance Elements $$\check{X}_{k|k-1} = \frac{1}{2n_x} \sum_{j=1}^{2n_x} \tilde{X}(1:n_x, j) \qquad \text{Eq. 9}$$

Eq. 9 allows determining a constrained state vector by computing the average of the sigma point matrix over its respective columns.

$$\check{P}_{k|k-1} = \frac{1}{2n_x} \sum_{j=1}^{2n_x} \left(\tilde{X}(1:n_x, j) - \check{X}_{k|k-1}\right)\left(\tilde{X}(1:n_x, j) - \check{X}_{k|k-1}\right)^T \qquad \text{Eq. 10}$$

Eq. 10 allows determining a constrained covariance matrix (e.g., analogous to unscented Kalman filter (UKF)). In one example embodiment, Eqs. 6-10 may be encompassed by block 54 (FIG. 3).

Performing Measurement Update $$\check{X}_{k|k} = \check{X}_{k|k-1} + K_k(Y_k^m - Y_k) \qquad \text{Eq. 11}$$

Eq. 11 allows correcting the state vector based on the difference between predicted $Y_k$ and measured $Y_k^m$ outputs.

$$\text{where } K_k = \check{P}_{k|k-1} C^T (C \check{P}_{k|k-1} C^T)^{-1} \qquad \text{Eq. 12}$$

$K_k$ represents a Kalman gain computed with the constrained covariance matrix determined in Eq. 10.

$$\check{P}_{k|k} = (I - K_k C)\check{P}_{k|k-1}(I - K_k C)^T + K_k R K_k^T \qquad \text{Eq. 13}$$

Eq. 13 allows updating the state covariance matrix considering the effects of actual plant measurements. In one example embodiment, Eqs. 11-13 may be encompassed by block 56 (FIG. 3).

Virtual Sensing $$Y_k^e = g^e(x_{k|k}, u_{k|k}, b_{k|k}, p_{k|k}) \qquad \text{Eq. 14}$$

As noted in the foregoing discussion, and mathematically represented by Eq. 14, originally unmeasured plant variable outputs—which may be desired for any of a variety of example purposes, such as plant control, monitoring and/or diagnostics—may be estimated by processing dynamic model 22 with the updated state vector.

It is contemplated that subsequent to "Performing Measurement Update" processing, depending on the needs of a given application, one could optionally perform a further constrain of the state estimates and matrix covariance by solving a constrained optimization (e.g., quadratic programming) problem using techniques, which would be available to one skilled in the art. For an example of a solution to such a constrained optimization, see paper titled "*Aircraft Turbofan Engine Health Estimation Using Constrained Kalman Filtering*" by Dan Simon and Donald L. Simon, ASME Conf. Proc. 2003, 485 (2003).

It will be appreciated that aspects of the inventive estimation system and method disclosed herein may be implemented by any appropriate processing system using any appropriate programming language or programming technique. The system can take the form of a hardware embodiment, a software embodiment or an embodiment comprising both hardware and software elements. In one embodiment, the system may be implemented by way of software (e.g., preemptively constrained EKF) and hardware (e.g., processor, sensors), which may include but is not limited to firmware, resident software, microcode, etc. Furthermore, parts of the system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. An interface display may be a tablet, flat panel display, PDA, or the like.

In one example embodiment, a processing system suitable for storing and/or executing program code may include in one example at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system to estimate variables in an integrated gasification combined cycle (IGCC) power generation plant, the system comprising:

a sensor suite coupled to sense signals indicative of respective plant input variables and plant output variables;

an extended Kalman filter coupled to receive sensed plant input variables and comprising a dynamic model of the plant to generate at a discrete time a plurality of plant state estimates and a covariance matrix for the state estimates;

a preemptive-constraining processor configured to preemptively constrain the state estimates and covariance matrix to be free of constraint violations;

a measurement-correction processor configured to correct constrained state estimates and a constrained covariance matrix based on processing of sensed plant output variables, wherein the measurement-correction processor is coupled to update the dynamic model with corrected state estimates and a corrected covariance matrix, and wherein the updated dynamic model is configured to estimate values for at least one plant variable not originally sensed by the sensor suite.

2. The system of claim 1, wherein each corrected state estimate for updating the dynamic model comprises at least one of the following: a dynamic state of the plant, a model parameter and a sensor bias.

3. The system of claim 2, wherein the measurement-correction processor is configured to correct the constrained state estimates based on a comparison of at least one sensed plant output variable with at least one corresponding model output variable.

4. The system of claim 2, wherein the measurement-correction processor is configured to update the model by way of an operation to define a previously unknown model parameter and/or correct a model parameter which varies in time.

5. The system of claim 1, wherein the preemptive-constraining processor is configured to determine a matrix of sigma-points from the covariance matrix of the state estimates.

6. The system of claim 5, wherein the matrix of sigma points determined by the preemptive-constraining processor comprises a first set of elements indicative of a positive deviation about a mean value of each state estimate, and a second set of elements indicative of a negative deviation about the mean value of each state estimate.

7. The system of claim 6, wherein the respective positive and negative deviations correspond to a selected sigma deviation.

8. The system of claim 6, wherein the preemptive-constraining processor is further configured to truncate respective elements of the sigma point matrix, which lie outside predetermined constraint bounds so that each element of the sigma point matrix lies within the predetermined bounds and is free of constraint violations.

9. The system of claim 8, wherein the preemptive-constraining processor is further configured to calculate a covariance matrix derived from a sigma point matrix, which is free of constraint violations.

10. The system of claim 9, wherein the preemptive-constraining processor is further configured to calculate a mean value vector derived from the sigma point matrix, which is free of constraint violations.

11. The system of claim 1, wherein the updated model is configured to estimate a respective bias in the respective plant input variables and plant output variables.

12. The system of claim 1, wherein the dynamic model comprises a reduced-order model of a gasification section of the plant comprising model parameters adapted to account for plant-model mismatch and/or time-varying characteristics of the plant.

13. A method to estimate variables in an integrated gasification combined cycle (IGCC) power generation plant, the method comprising:
coupling a sensor suite to sense signals indicative of respective plant input variables and plant output variables;
supplying sensed plant input variables to an extended Kalman filter, which comprises a dynamic model of the plant to generate at a discrete time a plurality of state estimates and a covariance matrix for the state estimates;
preemptively constraining the state estimates and covariance matrix to be free of constraint violations;
correcting constrained state estimates and a constrained covariance matrix based on processing of sensed plant output variables;
updating the dynamic model with corrected state estimates and a corrected covariance matrix; and
estimating with the updated dynamic model at least one plant variable not originally sensed by the sensor suite.

14. The method of claim 13, wherein each corrected state estimate for updating the dynamic model comprises at least one of the following: a dynamic state of the plant, a model parameter and a sensor bias.

15. The method of claim 14, wherein the processing of sensed plant output variables comprises comparing at least one sensed plant output variable with at least one corresponding model output variable.

16. The method of claim 14, wherein updating the dynamic model comprises defining a previously unknown model parameter and/or correcting a model parameter which varies in time.

17. The method of claim 13, wherein the preemptive constraining comprises determining a matrix of sigma-points from the covariance matrix of the state estimates.

18. The method of claim 17, wherein the matrix of sigma points comprises a first set of elements indicative of a positive deviation about a mean value of each state estimate, and a second set of elements indicative of a negative deviation about the mean value of each state estimate.

19. The method of claim 18, wherein the respective positive and negative deviations correspond to a selected sigma deviation.

20. The method of claim 18, wherein the preemptive constraining further comprises truncating respective elements of the sigma point matrix, which lie outside predetermined constraint bounds so that each element of the sigma point matrix lies within the predetermined bounds and is free of constraint violations.

21. The method of claim 17, wherein the preemptive constraining further comprises calculating a covariance matrix derived from a sigma point matrix, which is free of constraint violations.

22. The method of claim 21, wherein the preemptive constraining further comprises calculating a mean value vector derived from the sigma point matrix, which is free of constraint violations.

23. The method of claim 13, wherein the estimating with the updated model is configured to estimate a respective bias in the respective sensed plant input variables and plant output variables.

24. The method of claim 13, wherein the dynamic model comprises a reduced-order model of a gasification section of the plant comprising model parameters adapted to account for plant-model mismatch and time-varying characteristics of the plant.

25. A non-transitory tangible computer-readable medium having computer-executable instructions, which when executed by a processor are configured to perform the following actions:
measuring signals from a sensor suite, the signals indicative of respective plant input variables and plant output variables;
supplying sensed plant input variables to an extended Kalman filter, which comprises a dynamic model of the plant to generate at a discrete time a plurality of state estimates and a covariance matrix for the state estimates;
preemptively constraining the state estimates and covariance matrix to be free of constraint violations;

correcting constrained state estimates and a constrained covariance matrix based on processing of sensed plant output variables;
updating the dynamic model with corrected state estimates and a corrected covariance matrix; and
estimating with the updated dynamic model at least one plant variable not originally sensed by the sensor suite.

* * * * *

UNITED STATES PATENT AND TRADEMARK OFFICE
CERTIFICATE OF CORRECTION

PATENT NO. : 8,538,561 B2  
APPLICATION NO. : 13/053690  
DATED : September 17, 2013  
INVENTOR(S) : Kumar et al.

Page 1 of 1

It is certified that error appears in the above-identified patent and that said Letters Patent is hereby corrected as shown below:

In the Specification

In Column 4, Line 6, delete "dynamic model 12." and insert -- dynamic model 22. --, therefor.

In Column 6, Line 18, in Equation 2, delete "$X_{k|k-1}=F_{Ts}(X_{k-1|k-1},u_{k-1|k-1},P_{k-1|k-1})$" and insert -- $X_{k|k-1} = F_{Ts}(x_{k-1|k-1},u_{k-1|k-1},p_{k-1|k-1})$ --, therefor.

In Column 6, Line 23, in Equation 3, delete "$Y_k=g(x_{k|k-1},u_{k|k-1},P_{k|k-1})$" and insert -- $Y_k = g(x_{k|k-1},u_{k|k-1},p_{k|k-1})$ --, therefor.

In Column 6, Line 40, delete "EFK" and insert -- EKF --, therefor.

Signed and Sealed this  
Twenty-second Day of April, 2014

Michelle K. Lee  
*Deputy Director of the United States Patent and Trademark Office*